(12) United States Patent
Norris et al.

(10) Patent No.: US 9,594,179 B2
(45) Date of Patent: Mar. 14, 2017

(54) DIRECT ARRIVAL SIGNATURE ESTIMATES

(71) Applicants: Michael W. Norris, Cypress, TX (US); Joseph M. Reilly, Waller, TX (US)

(72) Inventors: Michael W. Norris, Cypress, TX (US); Joseph M. Reilly, Waller, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 256 days.

(21) Appl. No.: 14/377,296

(22) PCT Filed: Jan. 11, 2013

(86) PCT No.: PCT/US2013/021189
§ 371 (c)(1),
(2) Date: Aug. 7, 2014

(87) PCT Pub. No.: WO2013/137974
PCT Pub. Date: Sep. 19, 2013

(65) Prior Publication Data
US 2016/0003957 A1    Jan. 7, 2016

Related U.S. Application Data

(60) Provisional application No. 61/609,596, filed on Mar. 12, 2012.

(51) Int. Cl.
*G01V 1/38* (2006.01)
*G01V 1/36* (2006.01)
*G01V 1/28* (2006.01)

(52) U.S. Cl.
CPC ............... *G01V 1/36* (2013.01); *G01V 1/288* (2013.01); *G01V 1/38* (2013.01); *G01V 2210/56* (2013.01)

(58) Field of Classification Search
CPC . G01V 1/36; G01V 1/288; G01V 1/38; G01V 2210/56
See application file for complete search history.

(56) References Cited

U.S. PATENT DOCUMENTS 3,592,286 A    7/1971  Johnson
3,866,161 A    2/1975  Barr, Jr. et al.
(Continued)

FOREIGN PATENT DOCUMENTS

GB    WO 2010109280 A2 *  9/2010  ............... G01V 1/38

OTHER PUBLICATIONS

US 8,279,706, 10/2012, van Borselen et al. (withdrawn)
(Continued)

*Primary Examiner* — Luke Ratcliffe
*Assistant Examiner* — Samantha K Abraham
(74) *Attorney, Agent, or Firm* — ExxonMobil Upstream Research Company Law Department

(57) ABSTRACT

Method for estimating source signature of a marine seismic source array in a naturally band-limited subsurface region, for designature processing of resulting seismic data. Direct arrivals identified in the streamer receivers' records (131) provide a far-field estimate of the source signature, provided that the subsurface naturally limits frequencies to below the first notch frequency in the amplitude response of the seismic streamer receiver array. Processing of the direct arrivals may include move out or alignment correction (132), signal enhancement (133), summing of direct arrival traces over all offsets (134), windowing or tapering of direct arrivals (135), and deterministic corrections to the combined direct arrivals to compensate for ghosting and streamer array effects (136).

6 Claims, 8 Drawing Sheets

(56) References Cited

U.S. PATENT DOCUMENTS

| | | |
|---|---|---|
| 4,476,550 A | 10/1984 | Ziolkowski et al. |
| 4,644,507 A | 2/1987 | Ziolkowski |
| 4,658,384 A | 4/1987 | Dragoset, Jr. et al. |
| 4,694,435 A | 9/1987 | Magneville |
| 4,868,794 A | 9/1989 | Ziolkowski et al. |
| 4,908,801 A | 3/1990 | Bell et al. |
| 5,978,316 A | 11/1999 | Ambs et al. |
| 6,081,765 A | 6/2000 | Ziolkowski |
| 6,256,589 B1 | 7/2001 | Guimaraes |
| 6,493,636 B1 | 12/2002 | DeKok |
| 7,218,572 B2 | 5/2007 | Parkes |
| 7,330,401 B2 | 2/2008 | Jeffryes et al. |
| 7,377,357 B2 | 5/2008 | Duren et al. |
| 7,440,357 B2 | 10/2008 | Hopperstad |
| 8,102,731 B2 | 1/2012 | Cambois |
| 8,188,975 B2 | 5/2012 | Jung |
| 2005/0073909 A1 | 4/2005 | Laws et al. |
| 2008/0011540 A1* | 1/2008 | Moldoveanu ............ G01V 1/38 181/110 |
| 2010/0002539 A1 | 1/2010 | Kragh et al. |
| 2011/0032795 A1 | 2/2011 | Kragh et al. |
| 2011/0038227 A1 | 2/2011 | Kostov et al. |
| 2011/0299360 A1 | 12/2011 | Lansley et al. |
| 2012/0087207 A1 | 4/2012 | Kostov et al. |
| 2013/0201791 A1* | 8/2013 | Parkes ................ G01V 1/3808 367/24 |
| 2013/0238249 A1 | 9/2013 | Xu et al. |
| 2014/0016436 A1 | 1/2014 | Sollner et al. |
| 2014/0027122 A1 | 1/2014 | Meier et al. |

OTHER PUBLICATIONS

Karvis, S.P. (1985), "Estimation of Marine Source Signatures from Direct Arrivals to Hydrophone Groups," *Geophysical Prospecting* 33, pp. 987-998.

* cited by examiner

DIRECT ARRIVAL SIGNATURE ESTIMATES

CROSS-REFERENCE TO RELATED APPLICATION

This application is the National Stage entry under 35 U.S.C. 371 of PCT/US2013/021189 that published as WO 2013/137974 and was filed on 11 Jan. 2013, which claims the benefit of U.S. Provisional Application No. 61/609,596, filed on 12 Mar. 2012, each of which is incorporated by reference, in its entirety, for all purposes.

FIELD OF THE INVENTION

This disclosure relates generally to the field of seismic prospecting and, more particularly, to seismic data processing. Specifically, a method for estimating the far-field signature of a marine seismic source is disclosed.

BACKGROUND OF INVENTION

Seismic data acquisition using an air gun source array and streamer are depicted in FIG. 1. At each source location, the air guns in the air gun array 11 are activated and inject a pulse of high pressure air into the water. The acoustic signals created by these high pressure air impulses travel through the water and the earth and are received by seismic detectors in the streamer cable 12. The acoustic signals arriving at the seismic detectors in the streamer cable are a summation of energy 13 that has traveled directly through the water, energy reflected (not shown) from the ocean surface 15, energy 14 reflected/refracted from the ocean bottom 16, and energy reflected/refracted from acoustic impedance changes in the earth's subsurface (not shown).

It has long been recognized that an estimate of the seismic source's far-field signature is required to correctly recover the acoustic impedance changes. U.S. Pat. No. 3,866,161 to Barr and U.S. Pat. No. 3,592,286 to Johnson are early attempts to acquire estimates of the source signature. Later attempts at source signature estimation are illustrated by U.S. Pat. Nos. 4,476,550, 4,476,553, 4,644,507, 4,868,794, and 6,081,765, all to Ziollowski; U.S. Pat. No. 4,908,801 to Bell; and U.S. Patent Application No. 2010/0002539 by Kragh, all patents utilizing near-field hydrophones. Other methodologies used to estimate seismic source signatures are U.S. Pat. No. 4,658,384 to Dragoset, involving placement of a single detector in a circle of air guns; U.S. Pat. No. 4,648,080 to Hargreaves, involving use of a short streamer in the mid-field; U.S. Pat. No. 4,694,435 to Magneville and U.S. Pat. No. 6,256,589 to Guimaraes, both involving use of a vertical cable; U.S. Pat. No. 6,018,765 to Laws, involving use of a detector placed in the mid-field; and U.S. Pat. No. 7,440,357 to Hopperstad, involving utilizing near-field detectors and ocean bottom reflections.

Most of the methods described by these patents generate the desired far-field source signature estimate from near-field or mid-field measurements. The sensors in a typical streamer cable are normally in the far field. Typically the distance between the center of an air gun array and the center of the first streamer section is on the order of 100 to 150 m. For typical air gun array dimensions of 16 m by 15 m, the sections at the head of the streamer are in the far-field excepting possibly the first few sections. As noted by the Barr patent, and by Kravis ("Estimation of Marine Source Signatures from Direct Arrivals to Hydrophone Groups," *Geophysical Prospecting* 33, 987-998 (1985)), the spatial extent of a typical seismic air gun array is comparable to the wavelengths of the acoustic signals generated by the array of air guns. This spatial extent causes any measured source signature to be a function of the detector's distance from the air gun array and the detector's three-dimensional orientation with respect to the location of the air gun array.

There is no single definition for when a receiver is in the source's far field. Some working definitions include the following.

1. A receiver is in the far field when the character/shape of the measured signature is approximately constant with respect to the location of the center of the energy source. Once a signature is in the far-field, its amplitude is reduced as a function of the distance between the source's location and the measurement location; but the character/shape of the signature is constant.
2. Hargreaves (U.S. Pat. No. 4,648,080) uses that distance between a source array and a receiver at which the travel time difference due to travel path angularity between the extremities of the array and the receiver become insignificantly different from that which would be observed if the receiver were at infinity.
3. Laws (U.S. Pat. No. 6,081,765) uses $D^2/\lambda$ to estimate a minimum separation from the source, where D is the dimension of the source and $\lambda$ is the wavelength.
4. Dragoset (U.S. Pat. No. 4,658,384) defines it as a distance from the source array such that the travel time from all the sources is effectively equal, e.g. ≈2 to 5 ms.
5. For typical tow depths of 5 to 15 m, a receiver may be considered to be in the far field if the measurement point is 5 to 10 times the maximum dimension of the source array.

The tacit assumption is that the source generates a plane wave, so a far-field source signature estimate is really a far-field, zero incident angle signature. Current practice in seismic data processing is the assumption that a field record is the convolution of the source far-field signature with a time series that is the acoustic impedance of the earth. To recover the earth's acoustic impedance, the source signature must be removed from the recorded seismic trace (i.e. to designature a seismic trace). Poor estimates of the source signature leave artifacts in the seismic data that reduce the interpretability of the seismic section.

As described in Barr's U.S. Pat. No. 3,866,161, the desired vertical, far-field source signature can be measured directly by placing a detector at great depth below the air gun array. For typical air gun array depths on the order of 10 m, the far-field detector would need to be at a depth of approximately 300 m or more to be in the far-field and would need an additional 150 m or more of water below the far-field detector to generate a far-field estimate with a duration of 200 ms. As noted in many of the patents, this deep water requirement can add significant cost to a seismic survey. Additionally the need to locate in three dimensions both the air gun array, which is being towed through the water, and the far-field detector, which is typically stationary, increases the technical challenges with a subsequent increase in cost.

Because of the expense and technical complexity associated with measuring a far-field signature for each seismic survey, normal practice is to create air gun source signature estimates via air gun modeling programs. These programs provide source signature estimates such as the signatures shown in FIGS. 2 and 3. The primary differences between these two source signature estimates are the duration of the initial energy and the simplicity of the total signature. One measure of the compactness and simplicity of an air gun array signature is the signature's peak to bubble ratio, "PBR." This is the ratio of the amplitude of the initial peak to the peak amplitude of the bubble. Well-tuned air gun arrays have PBRs greater than 25 which provide source signatures with durations of 50 ms to 100 ms. With the short duration and high amplitude of a high-PBR source signature, neglecting the energy in the bubble does not seriously impact the quality of the final seismic imaging and data analysis.

In an attempt to increase the low frequency content of the air gun signatures, the depth of the air gun arrays has been increased, larger gun volumes have been substituted for smaller gun volumes, and the diversity of the gun volumes has been reduced. These actions have decreased the PBRs and increased the effective duration of the source signature from tens of milliseconds to hundreds of milliseconds. The increases in signature complexity and duration can be seen by comparing FIG. 2 to FIG. 3. The increased amplitude of the bubble train energy means that the designature processing must include the bubble train. For low PBR source signatures, not including the bubble train energy in the designature process effectively increases the noise floor in the final seismic image.

An unintended consequence of reducing the PBR is a reduction in the accuracy of the modeled source signature estimate. FIG. 4 compares the measured near-field signature with the modeled near-field signature for three gun volumes. The modeled air gun signatures provide a good estimate of the amplitude of the initial peak and a good estimate of the time the peak of the first bubble occurs. What the modeled signatures do not provide is a good estimate of the air gun bubble train. Consequently with deeper tow depths, as the peak to bubble ratio of an air gun source drops below 25 to 1, the modeled source signature estimate becomes less reliable.

The reliability of the source signature estimate is further reduced if the frequencies of interest are below 30 Hz. The decrease in signature reliability arises because a considerable amount of the energy below 20-30 Hz may be contained within the air gun bubble. The energy in the bubble train is significant for low PBR source arrays, since in geologic settings where there is strong overburden scattering and/or attenuation, the low frequency component (<30 Hz) is often the primary useable energy band. The obvious solution to an unreliable modeled source signature estimate is to measure the source signature. As noted in the previously cited patents, measured source signature estimates are acquired by 1) directly measuring the source signature using a deep tow sensor, 2) forming an extrapolation of near-field measurements, 3) towing a mini-streamer below and within the near-field of the air gun array, and 4) extracting an estimate of the source signature from the bottom arrivals. All of these methods of estimating a source's signature are either expensive or difficult to implement, or provide poor or contaminated estimates of the source signature. What is needed is a method that can provide a usable estimate of an air gun array's signature when modeling and other signature estimation techniques do not provide acceptable results.

SUMMARY OF THE INVENTION

A solution to obtaining a measured source signature estimate that is reliable for frequencies up to 70 to 80 Hz is to utilize the direct arrivals as recorded by the production marine streamer. This estimate can be generated by summing/windowing/filtering direct arrivals from common shot gathers and/or common receiver gathers. This source signature estimate can be directly used to create a mathematical operator to collapse the air gun source signature, or it can be deterministically corrected for known distortions such as receiver and source array directivity; then an operator can be generated. This solution is especially valuable for processing existing data sets where the bubble energy significantly impacts imaging in the deeper zone(s) of interest.

In one embodiment, the invention is a method for estimating source signature of a marine seismic source array in a naturally band-limited subsurface region, for subsequent processing of resulting seismic data, comprising:

obtaining a signal record from at least one seismic receiver deployed in the source's far field, and identifying direct arrivals from the source array in the record; and using a computer to process the direct arrivals to enhance them and to compensate for surface ghosting or receiver streamer array effects or both.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF PREFERRED EMBODIMENTS

Figure 1:
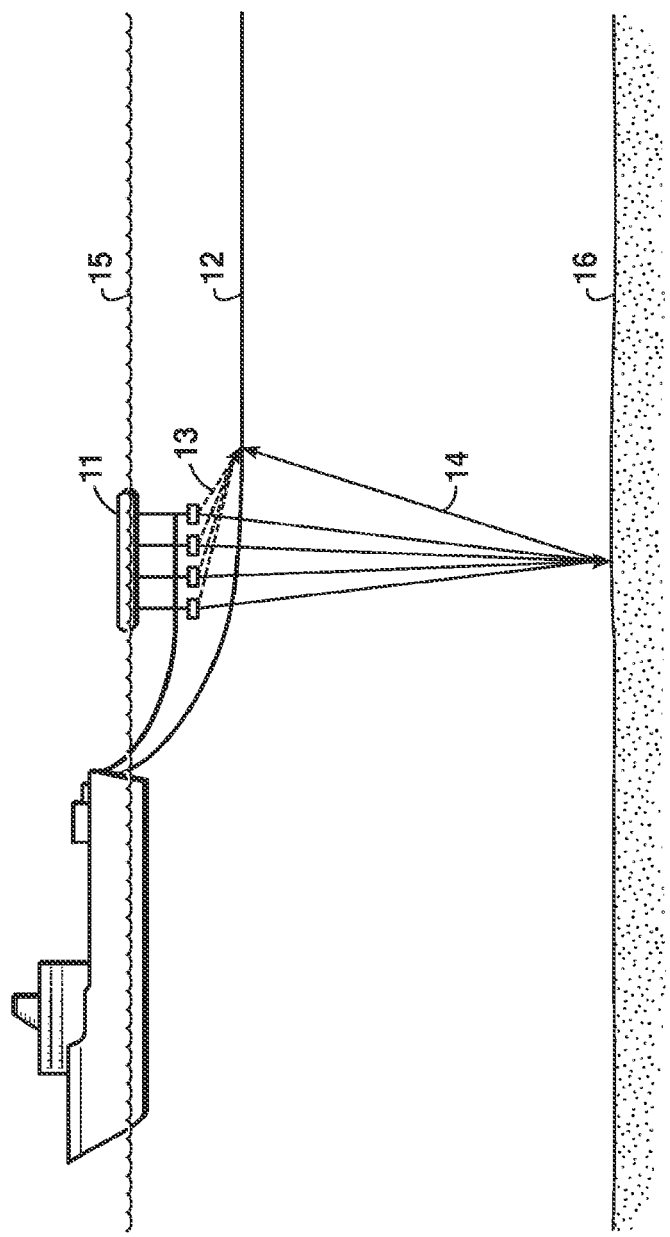
FIG. 1 is a diagram showing equipment components in a typical marine seismic acquisition.
Figure 2:
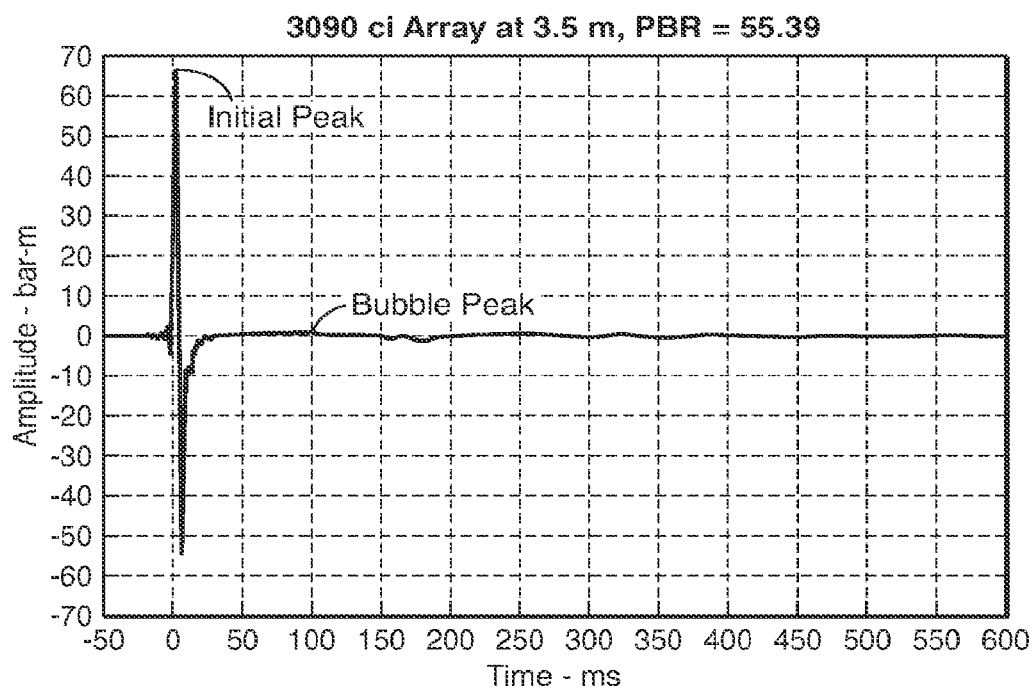
FIG. 2 shows a modeled signature of an air gun array with a peak to bubble ratio of 55.39.
Figure 3:
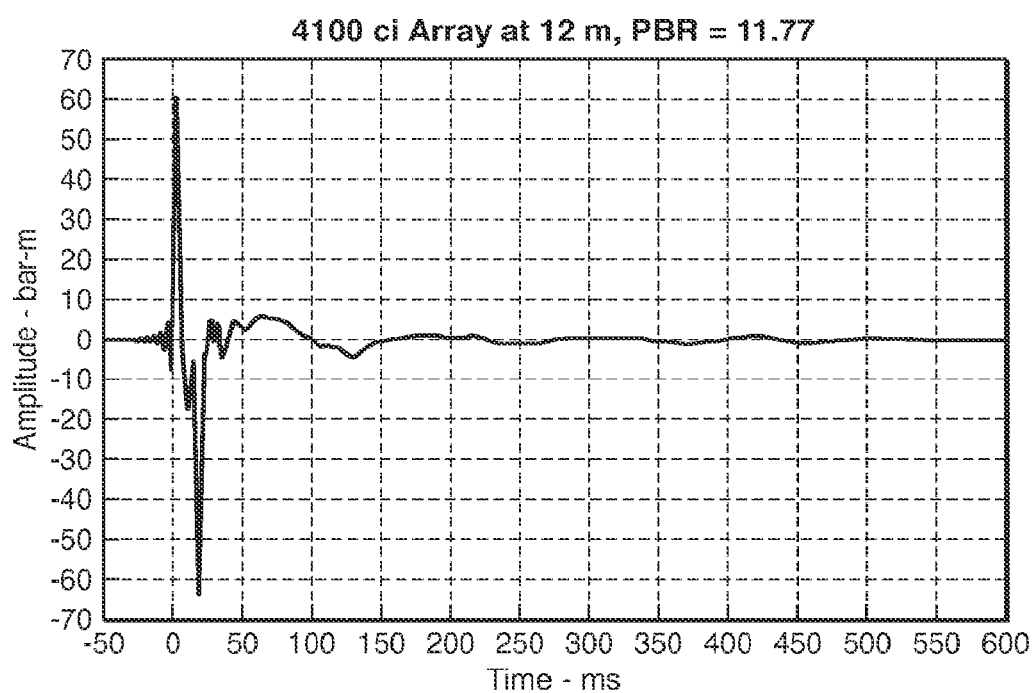
FIG. 3 shows a modeled signature of an air gun array with a peak to bubble ratio of 11.77.
Figure 4:
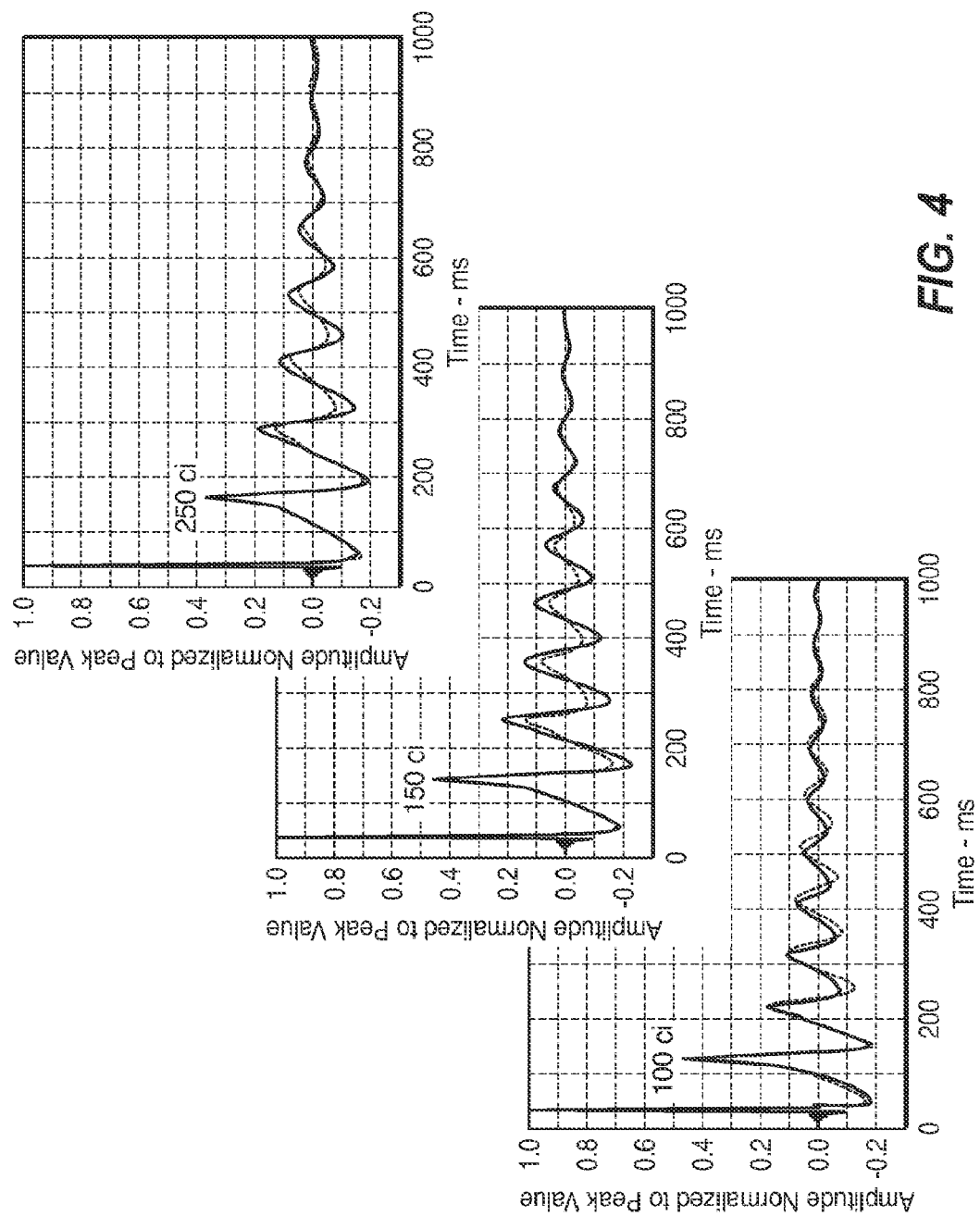
FIG. 4 shows a comparison of measured versus modeled individual air gun signatures for air guns with air chambers of 100 ci, 150 ci, and 250 ci.

In FIG. 1, the initial acoustic signals generated by an air gun array travel through the water and are reflected 14 from the ocean bottom. The initial acoustic energy also travels directly through the water 13 to the array of hydrophones that make up a seismic streamer group. Typically this direct arrival energy has not been considered for estimating the far-field signature because of the directional effects of both the air gun array and the directional effects of the hydrophone receiver array. However, direct arrivals have been used for estimates of the far-field signature made from a near-field or mid-field receiver especially added for the signature estimate.

The value of using the direct arrivals at the streamer cable is that they are always present for marine streamer seismic acquisition. Few operational or technical issues encumber the acquisition of these direct arrivals. The principle encumbrance is that the travel time difference between the direct arrivals and the water bottom reflections may not be very great, meaning there can be overlap between the bottom reflections and the later part of the air gun array's signature. Deeper water provides a longer time between the time of the direct arrival and the time the first water bottom reflection occurs. Longer times give cleaner estimates of the source signature. The direct arrivals are almost purely determined by the source signature, whereas the water bottom arrivals contain geology effects from the water bottom mixed in with the source signature, which effects can be difficult or impossible to remove.

A problem with direct arrivals at a marine streamer is that a marine streamer section is an array of hydrophones, so the direct arrival is the far-field signature convolved with the array response of the source array and the array response of the hydrophone array. These array responses place deep notches in the amplitude spectrum of the direct arrival. The amplitude and phase effects of deep notches cannot be removed because the notches attenuate the source signature to an unrecoverable amplitude. The far-field signature estimated from direct arrivals is only valid up to the first frequency notch. For areas below, for example, basalt/salt cover, the frequency notch is not an issue because the signal returned from the earth is band-limited to frequencies below the notch.

Figure 5:
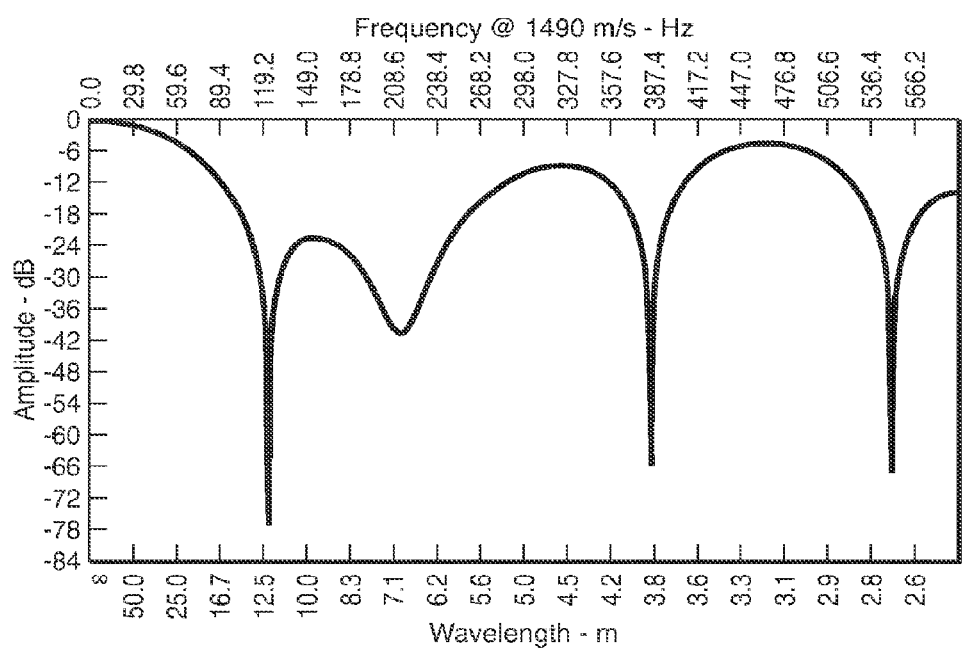
FIG. 5 shows the amplitude response of a seismic streamer receiver array as a function of wavelength and frequency for an apparent velocity of 1490 m/s.

This effect is illustrated in FIG. 5, which contains the amplitude response of a typical hydrophone receiver array as a function of wavelength. In a reasonably homogeneous velocity medium such as the ocean's near surface, the wavelength can be converted to a frequency when a constant velocity is assumed. In FIG. 5, the upper horizontal axis gives the frequency for a constant velocity of 1490 m/s. In this spectrum, the first notch occurs at approximately 123 Hz. Up to this frequency, the amplitude spectrum is smooth and capable of being inverted. The deep notch at this frequency limits the high frequency content of any filter used to remove the source signature. Normally this upper frequency limit is an issue so the direct arrivals from the source array have not been used to generate source signature estimates. In exploration areas such as basalt covered areas, the limit on high frequency content in the inversion filter is not an issue because the field data are naturally band limited by the earth's response. Consequently in naturally band-limited areas, it is a discovery of the present invention that the direct arrivals can be used to generate an estimate of the source signature.

Figure 6:
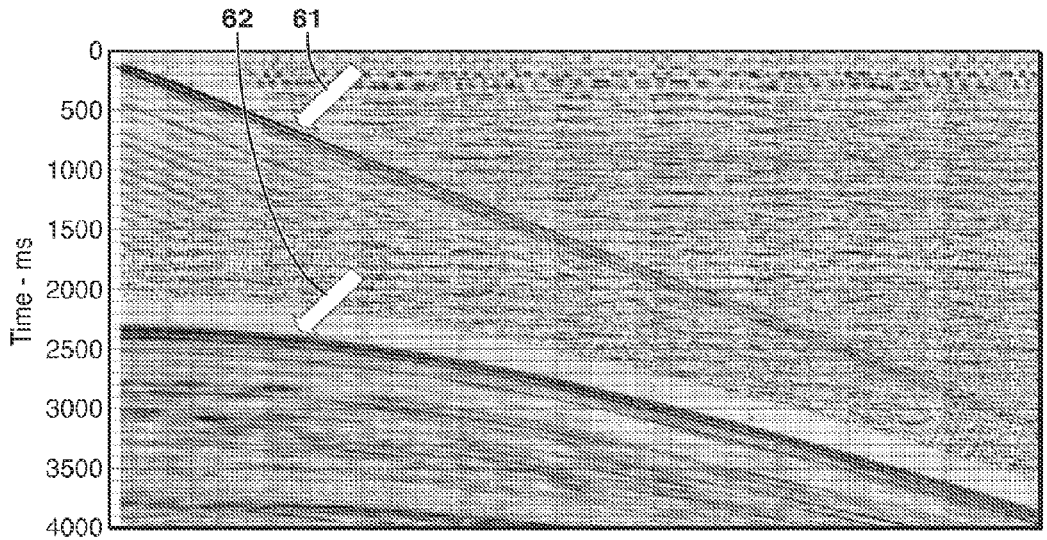
FIG. 6 shows a common shot record for a marine steamer.

FIG. 6 is a common shot gather where an air gun array with a low PBR was used to acquire seismic data in a deep water environment. In this figure, the direct arrivals at the streamer receiver array and the ocean bottom arrivals are noted respectively by the reference numbers 61 and 62. The diagonal events that occur after the direct arrivals are the bubble train that follows the initial peak of the air gun signature. The figure has been gained so the bubble train can be easily identified.

Figure 7:
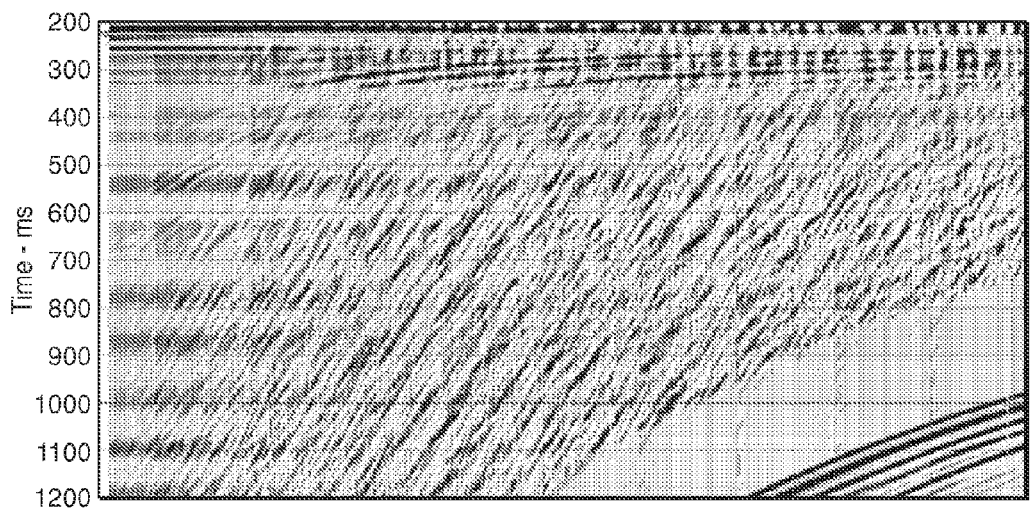
FIG. 7 shows a common shot record for a marine streamer after a linear moveout of 1490 m/s has been applied.
Figure 8:
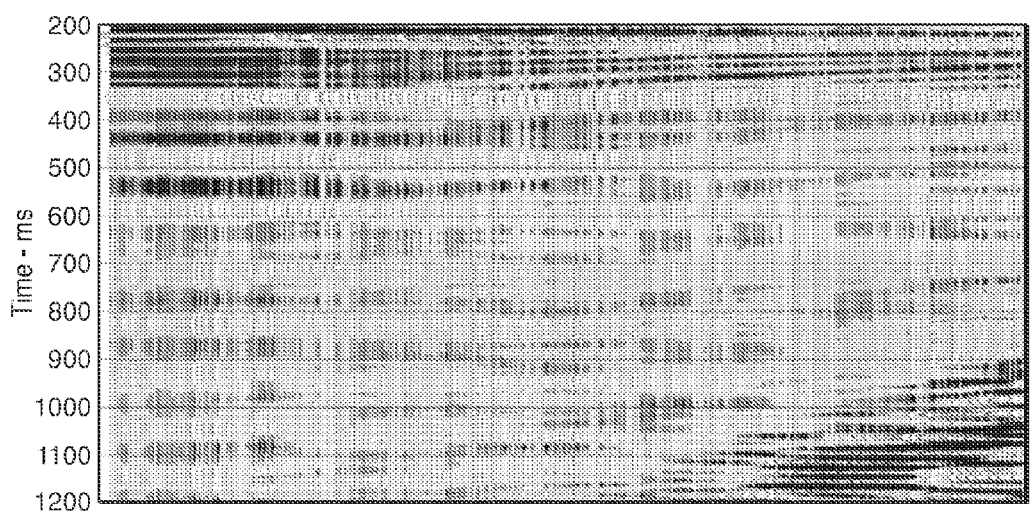
FIG. 8 shows a common shot record for marine streamer after a linear moveout of 1490 m/s and FK filter have been applied.
Figure 9:
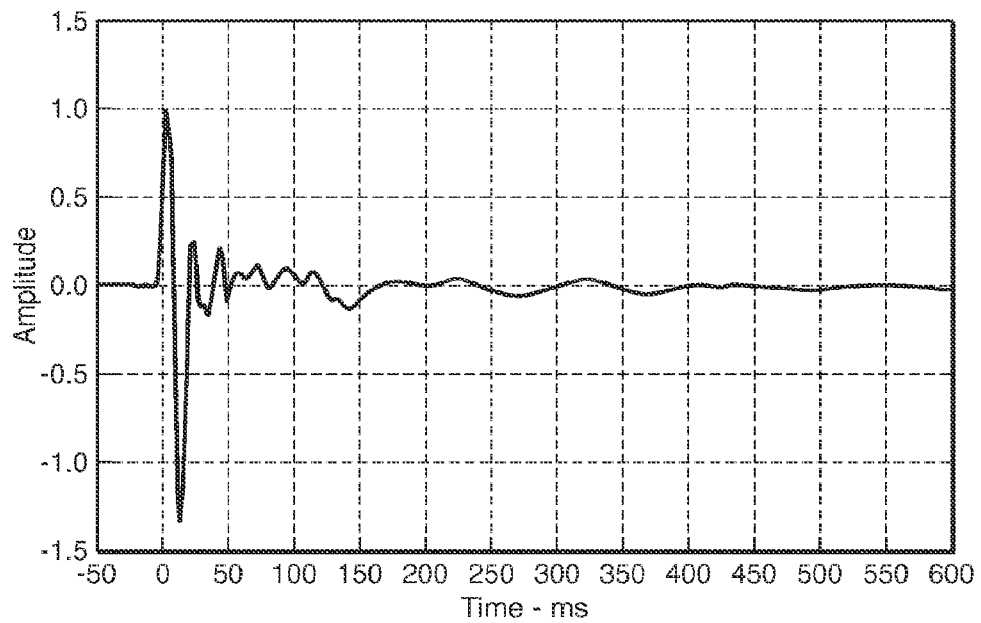
FIG. 9 shows an air gun source signature estimate extracted from the direct arrivals at the steamer cable by the present inventive method.

The air gun bubble train can be characterized as low frequency events that are parallel to the initial source impulse. This characterization is clearly visible in FIG. 7 when linear moveout, LMO, is applied to the shot record shown in FIG. 6. The direct arrival air gun energy can be further enhanced by applying an FK spatial filter to remove the dipping events seen in FIG. 7. Once the direct arrivals from the air gun array are sufficiently isolated, they can be extracted and summed or averaged or statistically selected to create an estimate of the air gun signature as shown in FIG. 9. This signature exhibits the complex structure and the extended duration that would be expected from the low PBR air gun source that was used.

Figure 10:
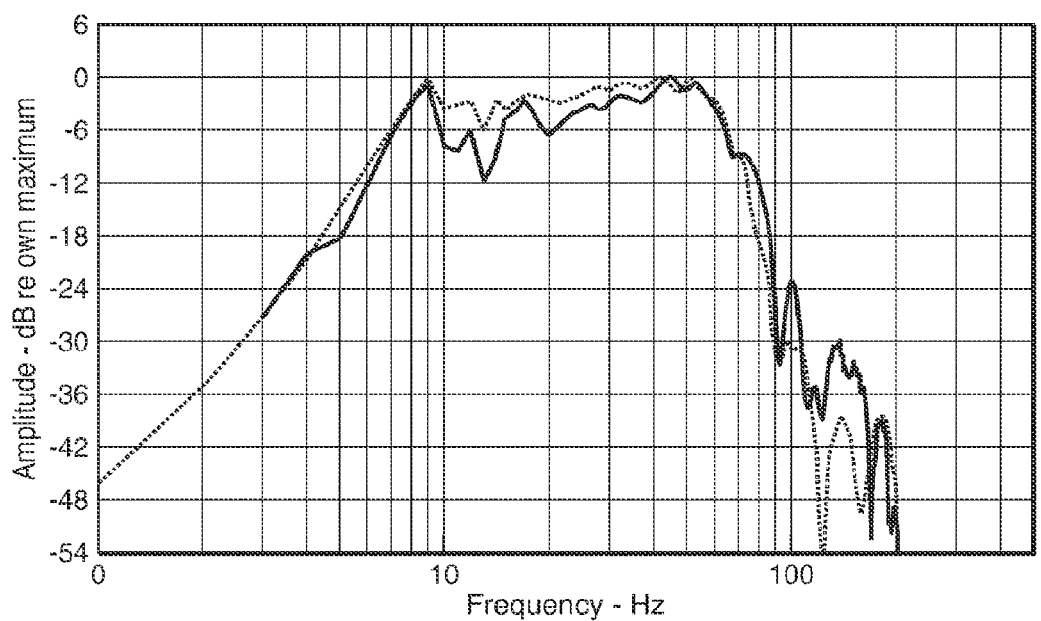
FIG. 10 shows a comparison of the amplitude spectra of a modeled source signature corrected for the receiver array response and a source signature extracted from the streamer direct arrivals.

The amplitude spectrum of this signature (solid line in FIG. 10) can be compared to a modeled signature (dotted line in FIG. 10) if the receiver group response is applied to the modeled signature. This comparison is shown in FIG. 10. As would be expected, the greatest differences between two spectra are in the 9 Hz to 30 Hz region where the bubble energy resides and the air gun modeling is least reliable.

Figure 13:
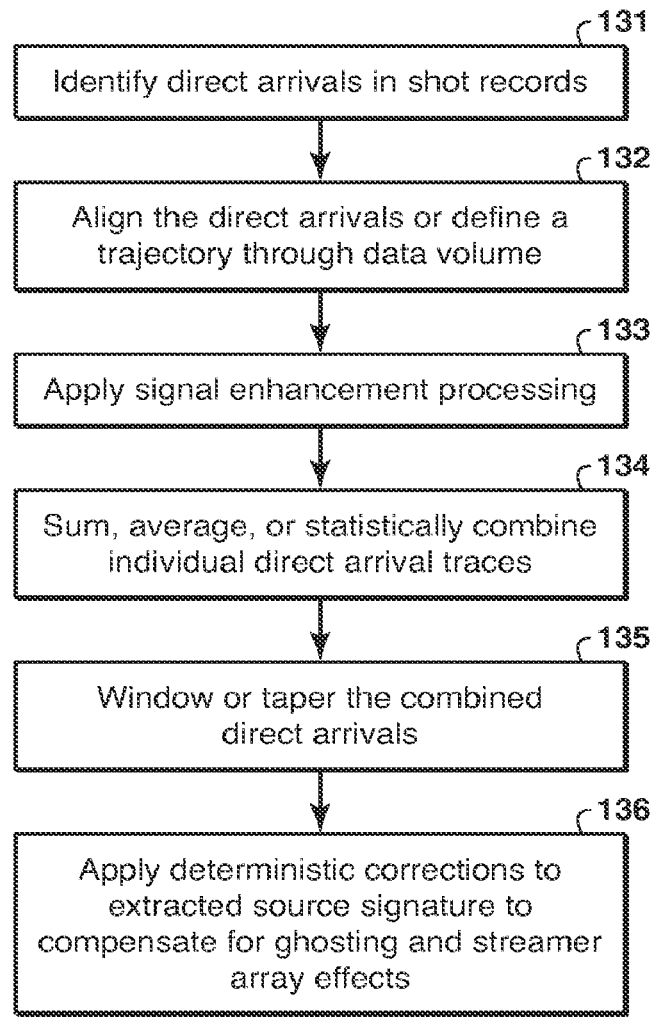
FIG. 13 is a flowchart showing basic steps in one embodiment of the present inventive method.

One embodiment of the present inventive method for creating a source signature estimate from the direct arrivals at a streamer cable may be summarized as follows, with reference to the flowchart of FIG. 13. At step 131, the region of the data where the direct arrival is the dominant signal is located in the shot records of the survey streamer receivers.

At step 132, a linear moveout is applied to the shot record(s) at the apparent water velocity. Alternatives include summing the traces along a path slanted at the apparent water velocity, or summing channels for different shots and time shift. For 2D streamer acquisition (see FIG. 1), the center of the source array and the streamer cable can be assumed to lie on a line. Even for 3D streamer acquisition, this is a reasonable assumption for the center cables because the cross-line offset of the center of the source array is small compared to the inline offset between the center of the source array and the center of the first group of receivers. If the center of the source array and the centers of the receiver groups do lie on a common line, and because the distance between the receiver groups is typically a constant, the difference in the arrival times at successive receiver groups will be a constant time. In other words, the direct arrivals are said to have a linear moveout as a function of time.

Linear moveout ("LMO"), is a processing step that moves the samples in a seismic trace up or down in time by a constant number of seconds. The amount of time translation is a function of the trace's distance from the center of the source array and a user-specified velocity. If the center of the source array and the center of the receiver groups lie on a line, then applying a linear moveout at water velocity will cause the onset of the direct arrivals at each of the receiver groups to occur at the same time. Because of a number of reasons, the onset alignment is never perfect; but to a first order, it is acceptable for calculating a source signature estimate.

LMO is one way to align the onset of the direct arrivals so the direct arrival waveforms can be summed or averaged or statistically (medians or principle component analysis) combined. An equivalent process is to sum the traces samples based on a trajectory defined by a straight line. Alternate but also equivalent processing would be to align the direct arrivals based on the peak amplitude of the initial peak. Alternately the direct arrivals can be aligned by computing the peak energy arrival.

At step 133, signal processing techniques are applied, such as time domain filters, spatial filters, averaging and median sample selection to enhance the direct arrivals. At step 134, process the individual direct arrival traces via summation, averaging or statistically combination. At step 135, the combined direct arrivals are windowed and/or tapered. At step 136, deterministic corrections are applied to the source signature to compensate for ghosting and streamer array effects.

Steps 133-135 are generic signal processing steps that might be used, for example, in making estimates of far-field signature from near or mid-field measurements.

These six processing steps are illustrative of the processing that may be used to create a source signature estimate from the direct arrivals at a marine streamer cable using the present inventive method. Those skilled in signal processing recognize that there are numerous equivalent processing substitutions that can be made, and the order of process application is for the most part commutable. A marine air gun source has been used to describe the methodology; but the methodology is equally applicable to all marine sources used in a comparable acquisition geometry with respect to a seismic streamer cable.

Figure 11:
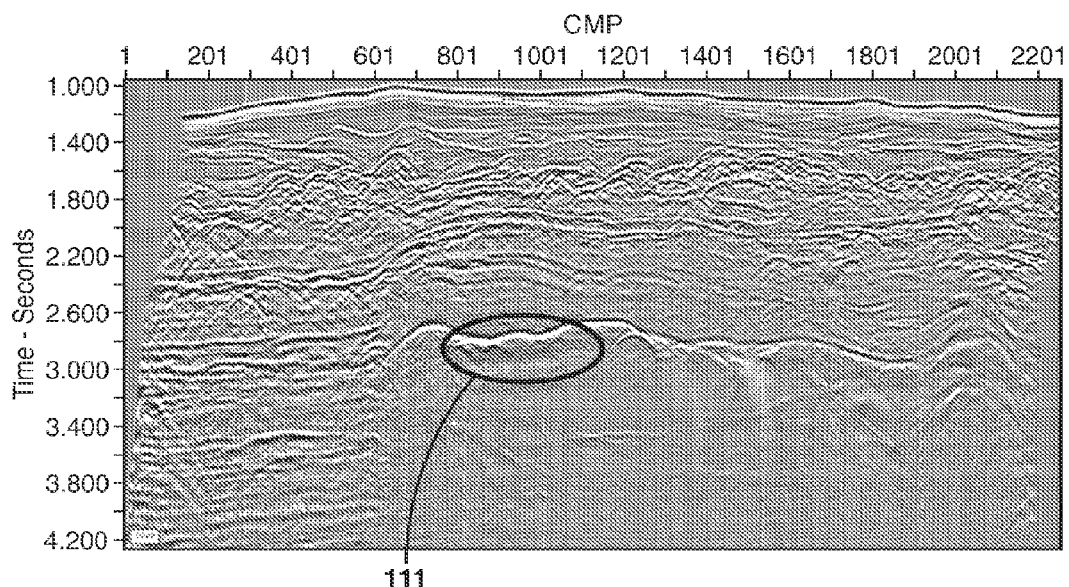
FIG. 11 shows a sample 2-D line processed using a typical modeled air gun signature.
Figure 12:
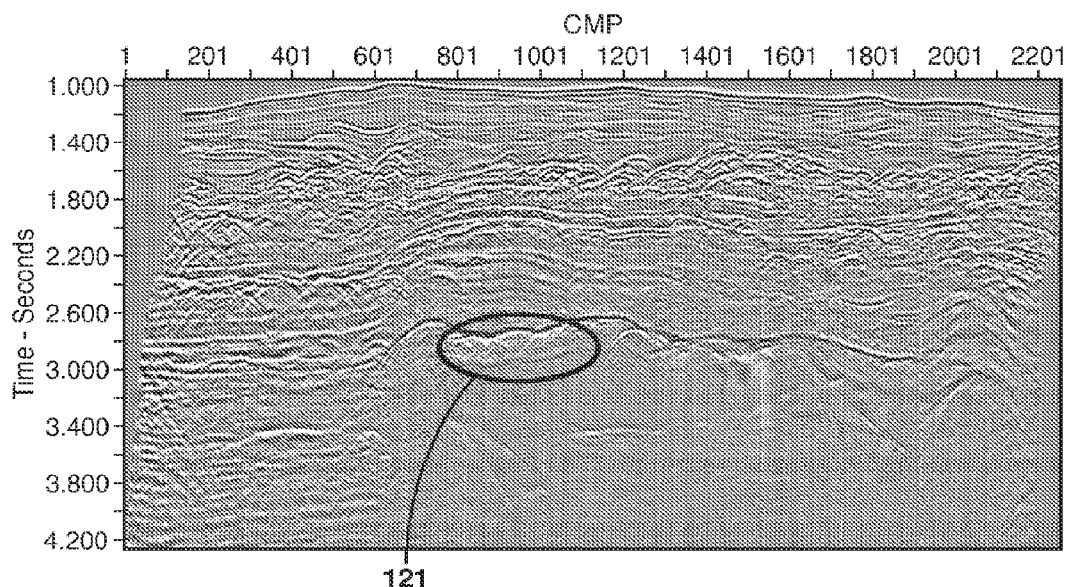
FIG. 12 shows a sample 2-D line processed using a source signature extracted from the direct arrivals at the streamer cable by the present inventive method.

Application of the present inventive method is illustrated by comparing FIG. 11 to FIG. 12. FIG. 11 is the seismic image created using a designature process utilizing a modeled source signature. FIG. 12 has been created by extracting the source signature estimate from the direct arrivals according to the present inventive method, and creating the designature operator utilizing the extracted direct arrival signature. Both images have been filtered to a common frequency band and are gained in the same manner. The designature based on the extracted direct arrival enhances the reflectors below 2600 ms that are the primary interest in this area. See regions 111 and 121.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, at least some of the steps in the present inventive method are performed on a computer, i.e. the invention is computer implemented. In such cases, the resulting adapted template(s) or noise-suppressed target dataset may either be downloaded or saved to computer memory.

REFERENCES

Kravis, S, "Estimation of Marine Source Signatures from Direct Arrivals to Hydrophone Groups," *Geophysical Prospecting* 33, 987-998 (1985).

The invention claimed is:

1. A method for estimating source signature of a marine seismic source array in a naturally band-limited subsurface region, for subsequent processing of resulting seismic data, comprising:

obtaining a signal record from at least one seismic receiver deployed in the source array's far field, and identifying direct arrivals from the source array in the signal record; and generating a far-field estimate of the source signature by using a computer to process the direct arrivals to enhance them and to compensate for surface ghosting or receiver streamer array effects or both, wherein the direct arrivals used to generate the far-field estimate of the source signature were recorded by the at least one seismic receiver deployed in the source array's far field.

2. The method of claim 1, wherein the direct arrivals are windowed or tapered, or both, before the compensating for surface ghosting or receiver streamer array effects.

3. The method of claim 1, wherein the at least one seismic receiver deployed in the source array's far field is one of a plurality of receivers located at different offsets from the source array, and the method further comprises applying a moveout correction or aligning the direct arrivals to correct for time differences due to the different offsets.

4. The method of claim 3, further comprising determining amplitude response versus wavelength for the at least one seismic receiver deployed in the source array's far field, converting that to amplitude response versus frequency by assuming a seismic wave velocity in water, then identifying notches in the amplitude response versus frequency, selecting the lowest-frequency notch, then confirming that the natural band limit of the subsurface region occurs at a frequency below the lowest notch frequency.

5. The method of claim 1, wherein the subsequent processing of resulting seismic data comprises removing source signature effects from the seismic data.

6. The method of claim 1, where the seismic source array is an array of air guns, and the at least one seismic receiver in the source array's far field is one or more hydrophones.

* * * * *